United States Patent
Franklin et al.

(10) Patent No.: US 10,969,267 B1
(45) Date of Patent: Apr. 6, 2021

(54) PARALLEL PLANAR WEIGHT SENSING DEVICE

(71) Applicant: AMAZON TECHNOLOGIES, INC., Seattle, WA (US)

(72) Inventors: Nicholas Franklin, Maple Valley, WA (US); Jeremy Samuel De Bonet, Southborough, MA (US); Nicholas McMahon, Bolton, MA (US); Nicholas Mendenhall, Kirkland, WA (US); Paul Eugene Munger, Seattle, WA (US); Jacob Siegel, Southborough, MA (US); Zihui Zhang, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 194 days.

(21) Appl. No.: 16/290,320

(22) Filed: Mar. 1, 2019

(51) Int. Cl.
| | |
|---|---|
| *G01G 19/414* | (2006.01) |
| *G01G 19/18* | (2006.01) |
| *G01G 21/23* | (2006.01) |
| *G01G 21/28* | (2006.01) |
| *G06Q 10/08* | (2012.01) |

(52) U.S. Cl.
CPC ............. *G01G 19/18* (2013.01); *G01G 21/23* (2013.01); *G01G 21/28* (2013.01); *G01G 19/4144* (2013.01); *G06Q 10/087* (2013.01)

(58) Field of Classification Search
CPC ........ G01G 19/18; G01G 21/28; G01G 21/23; G01G 19/4144; G06Q 10/087
See application file for complete search history.

(56) References Cited

U.S. PATENT DOCUMENTS

| | | | | |
|---|---|---|---|---|
| 4,433,741 A | * | 2/1984 | Ryckman, Jr. ....... | G01G 3/1402 177/199 |
| 4,953,244 A | * | 9/1990 | Koerber, Sr. ........ | G01G 19/445 5/600 |
| 4,961,470 A | * | 10/1990 | Koerber, Sr. ............ | A61G 7/05 177/144 |

(Continued)

OTHER PUBLICATIONS

Asthana, et al. "An Indoor Wireless System for Personalized Shopping Assistance" CiteSeerX, In Proceedings of IEEE Workshop on Mobile Computing Systems and Applications, 1994. Retrieved from the Internet: http://citeseerx.ist.psu.edu/viewdoc/summary?doi=10.1.1.127.3033&rank=1.

(Continued)

*Primary Examiner* — Randy W Gibson
(74) *Attorney, Agent, or Firm* — Lindauer Law, PLLC

(57) ABSTRACT

A parallel planar weight sensing device includes an accessory mounting bracket with an upper portion and a lower portion. Part of the accessory mounting bracket extends around a crossmember that also has an upper portion and a lower portion. Affixed to the upper portion of the crossmember is a first load cell while a second load cell is affixed to the lower portion of the crossmember. The upper portion of the accessory mounting bracket is affixed to the first load cell while the lower portion is affixed to the second load cell. An accessory, such as a shelf or hook, may be attached to the accessory mounting bracket and used to stow items. As the load on the accessory changes, such as due to a pick or place of items, a total weight change may be determined by summing the output from the load cells.

20 Claims, 8 Drawing Sheets

(56) References Cited

U.S. PATENT DOCUMENTS

| | | | | |
|---|---|---|---|---|
| 4,993,506 A * | 2/1991 | Angel | ............... | G01G 3/1402 177/211 |
| 5,510,581 A * | 4/1996 | Angel | ............... | G01G 3/141 177/211 |
| 5,859,390 A * | 1/1999 | Stafford | ............... | G01G 19/445 177/144 |
| 5,929,391 A * | 7/1999 | Petrucelli | ............... | G01G 3/08 177/211 |
| 6,571,456 B2 * | 6/2003 | Bruns | ............... | G01G 19/4142 29/25.35 |
| 6,835,899 B2 * | 12/2004 | Wolfe | ............... | G01G 21/28 177/144 |
| 7,225,980 B2 | 6/2007 | Ku et al. | | |
| 7,335,839 B2 * | 2/2008 | Metz | ............... | A61G 7/012 177/144 |
| 7,947,912 B2 * | 5/2011 | Weichao | ............... | G01G 3/14 177/211 |
| 7,949,568 B2 | 5/2011 | Fano et al. | | |
| 7,994,440 B2 * | 8/2011 | Oseko | ............... | G01G 19/44 177/238 |
| 8,009,864 B2 | 8/2011 | Linaker et al. | | |
| 8,189,855 B2 | 5/2012 | Opalach et al. | | |
| 8,630,924 B2 | 1/2014 | Groenevelt et al. | | |
| 9,046,408 B2 * | 6/2015 | Chan | ............... | G01G 19/4144 705/28 |
| 9,235,928 B2 | 1/2016 | Medioni et al. | | |
| 9,473,747 B2 | 10/2016 | Kobres et al. | | |
| 10,614,415 B1 * | 4/2020 | De Bonet | ............... | G01L 5/00 |
| 10,732,026 B1 * | 8/2020 | Danenberg | ............... | G01G 21/00 |
| 10,746,589 B1 * | 8/2020 | Danenberg | ............... | G01G 21/22 |
| 2003/0047603 A1 * | 3/2003 | Lustenberger | ............... | G01G 19/42 235/385 |
| 2011/0011936 A1 | 1/2011 | Morandi et al. | | |
| 2012/0284132 A1 | 11/2012 | Kim et al. | | |
| 2013/0284806 A1 | 10/2013 | Margalit | | |
| 2015/0086107 A1 | 3/2015 | Dedeoglu et al. | | |
| 2016/0048798 A1 * | 2/2016 | Meyer | ............... | G01G 19/4144 705/28 |

OTHER PUBLICATIONS

Kalnikaite, et al., "How to Nudge In Situ: Designing Lambent Devices to Deliver Information Salience in Supermarkets", ACM, In proceeding of: UbiComp 2011:Ubiquitous Computing,13th International Conference, UbiComp 2011, Beijing,China, Sep. 17-21, 2011.Retrieved from the Internet: URL:http://www.researchgate.net/publication/221568350_How_to_nudge_in_Situ_designing_lambent_devices_to_deliver_salient_information_in_supermarkets.

Pop, Cristian, "Introduction to the BodyCom Technology" AN1391, DS01391A, Microchip Technology, Inc., May 2, 2011. Retrieved from the Internet: http://www.microchip.com//wwwAppNotes/AppNotes.aspx?appnote=en555156.

Vu, et al., "Distinguishing Users with Capacitive Touch Communication" WINLAB, Rutgers University, In proceedings of: The 18th Annual international Conference on Mobile computing and networking. pp. 197-208. Aug. 2012. Retrieved from the Internet: http://www.winlab.rutgers.edu/~janne/capacitivetouch_mobicom12.pdf.

* cited by examiner

PARALLEL PLANAR WEIGHT SENSING DEVICE

BACKGROUND

Retailers, wholesalers, and other product distributors typically maintain an inventory of various items that may be ordered, purchased, leased, borrowed, rented, viewed, and so forth, by clients or customers. For example, inventory may be stored and distributed from a fulfillment center. When a customer orders an item, the item is picked from inventory, routed to a packing station, packed, and shipped to the customer. Likewise, retail stores maintain inventory in customer accessible areas, such as in a shopping area, and customers can pick items from inventory and take for purchase, rental, and so forth. Other examples of entities that maintain facilities holding inventory include libraries, museums, rental centers, and so forth. In each instance, for an item to be moved from one location to another, it is picked from its current location and transitioned to a new location. It is often desirable to monitor quantity and movement of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
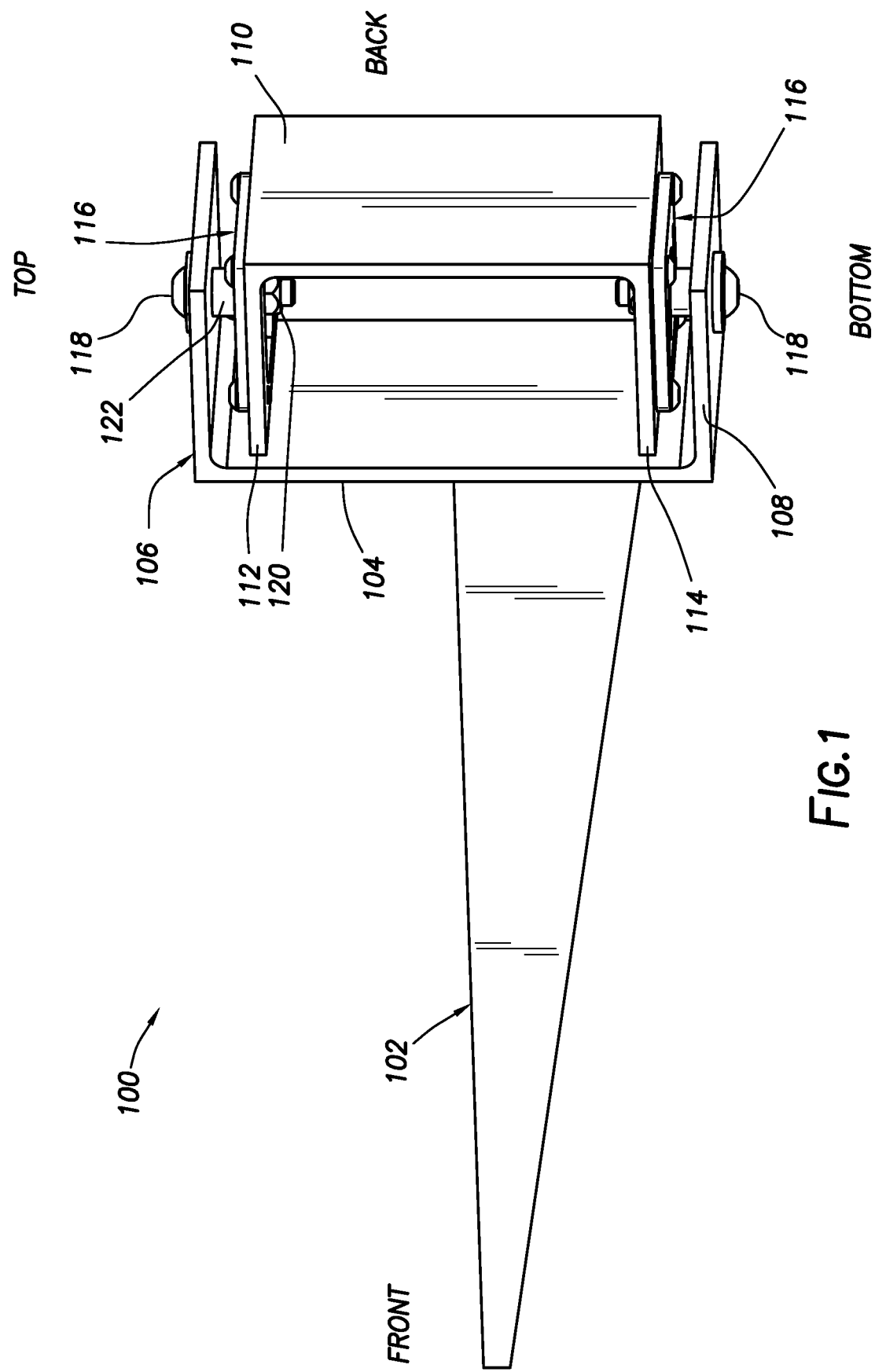
FIG. 1 illustrates a parallel planar weight sensing device with an accessory to support items, according to one implementation.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A material handling facility (facility) or other setting may utilize fixtures that provide inventory locations used to stow or otherwise hold items. For example, the fixtures may include a crossmember that is used to support one or more accessories such as shelves, hooks, bins, baskets, and so forth that are then used to store items. The accessories are cantilevered, extending away from the crossmember. In some implementations, each accessory may be used to store a single type of item. Sensors in the environment provide sensor data. For example, the fixtures may include weight sensors that measure the weight of the accessory and any items that it supports and provide weight sensor data. In another example, cameras may provide image data.

The facility may include, or have access to, an inventory management system. The inventory management system may be configured to maintain information about items, users, condition of the facility, and so forth based at least in part on the sensor data. The inventory management system may use the sensor data to determine interaction data. The interaction data may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the inventory management system may generate interaction data that indicates what item the user picked from a particular lane on a shelf, and then use this interaction data to adjust the count of inventory stowed at that lane. The interaction data may then be used to bill an account associated with the user for the item that was picked or credit the account for the item that was placed.

In a traditional device, a cantilevered arm supporting a load produces a relatively large mechanical movement on a load cell. A change in loading of a cantilevered arm in a traditional device will result in twisting and this device behaves like a torsion spring. This results in undesirable deflection of the cantilevered arm as well as ongoing oscillation and overall susceptibility to vibration. For example, even if the load on the cantilevered arm does not change, ambient vibration to the overall structure (such as from a passing truck) may result in undesirable movement of the cantilevered arm. In traditional devices, these undesirable movements produce noisy output signals from weight sensors that may be unusable or require significant signal processing to provide usable data. These undesirable movements may also impair use of the device. For example, trying to add or remove an object to a moving cantilevered arm is more demanding than the same action on a stationary cantilevered arm. Undesirable movements may introduce mechanical interactions with material supported by the cantilevered arms. For example, if the load comprises liquids in containers, movement of the cantilevered arm may introduce undesired movement of the liquids in the containers.

Traditional devices that attempt to minimize some of these issues are limited to relatively light loads, are prohibitively expensive to implement, and do not scale well to larger form factors.

Described in this disclosure is a parallel planar weight sensing device (device) that provides support for a cantilevered accessory to support a load. Compared to traditional devices, the device described herein provides significantly improved resistance to torsion, reducing displacement of the cantilevered arm and oscillation of the device. The output from weight sensors in the parallel planar weight sensing device may experience less noise as a result of reduced undesirable movement.

The device may be implemented in different size form factors, allowing use with loads ranging from grams to thousands of kilograms or more. Implementations of the device described herein for larger size form factors, such as devices supporting a load of tens to hundreds of kilograms, are also significantly less expensive than traditional devices. This reduction in cost facilitates increased deployment, allowing the device to be used more extensively.

The inventory locations may use one or more parallel planar weight sensing devices. For example, an inventory location may comprise one or more crossmembers. Each crossmember may be part of one or more parallel planar weight sensing devices.

The parallel planar weight sensing device comprises a crossmember. An accessory mounting bracket (bracket) is attached to the crossmember. One or more accessories may then be attached to, or are integral with, the bracket. The accessory may include a hook, shelf, bin, basket, dispenser, and so forth that stows an item. An accessory may be supported by more than one bracket. A crossmember may support more than one bracket. For example, a single crossmember may support sixteen brackets. Three brackets may support accessories with hooks from which bagged items may be suspended, seven brackets may support shelves upon which boxed items may sit, and six brackets may support bins to contain loose items. As the needs of the facility change, the accessories may be easily added to or removed from particular brackets.

The crossmember and the bracket are rigid and may comprise unitary structures or may be made up of several pieces. For example, the crossmember may comprise several pieces that are joined together while the bracket also comprises several pieces that are joined together. As a result, the device may be easily constructed in larger sizes that would otherwise require prohibitively expensive fabrication of single piece elements.

The crossmember and the bracket are joined to one another at two locations, each location comprising a weight sensor. The locations may be located opposite one another with respect to the crossmember. The weight sensor at each of the two locations may comprise a planar beam load cell having a live end and a fixed end. In one implementation the live end of the planar beam load cell is affixed to the bracket while the fixed end is affixed to the crossmember. The planar beam load cells may be arranged coplanar to one another. For example, the body of each planar beam load cell describes a plane that extends through a length and width of the body. In this implementation, an axis extending through the live ends of the two planar beam load cells is perpendicular to the plane of each of the planar beam load cells. A load is applied to the accessory that cantilevers from the bracket, the bracket exerts a vertical force and a twisting force. The twisting force results in a lateral force on each load cell. The vertical force on each of the load cells is summed while the lateral forces as applied in opposing directions are opposed by the rigidity of the crossmember and cancel one another out. The vertical force is measured by each of the weight sensors and used to produce weight sensor data. The weight sensor data for the two load cells may be summed to calculate a total weight value.

The device described in this disclosure provides a relatively low cost, physically robust device for determining weight of a cantilevered load. Information about the weight may be used by the inventory management system to facilitate and improve operations by providing information as to the current quantity and movement of items in the facility.

Illustrative Device

FIG. 1 illustrates a parallel planar weight sensing device 100 with an accessory to support items, according to one implementation. An accessory 102 is depicted. The accessory 102 may comprise a hook, a shelf, a bin, a basket, or other structure that may be used to stow items. The accessory 102 may also include one or more engagement features that mechanically engage one or more engagement features on an accessory support bracket (bracket) 104. The bracket 104 is a rigid structure. For example, the bracket 104 may comprise one or more pieces of metal, plastic, composite material, and so forth. The bracket 104 may exhibit a "C" shape as shown here. The bracket 104 has an upper portion 106 and a lower portion 108.

The device includes a crossmember 110. The crossmember 110 is a rigid structure. For example, the crossmember 110 may comprise one or more pieces of metal, plastic, composite material, and so forth. The crossmember 110 may exhibit a "C" shape as shown here. The crossmember 110 has an upper portion 112 and a lower portion 114.

The crossmember 110 may be arranged within at least a portion of the bracket 104. For example, the upper portion 106 of the bracket 104 may be proximate to the upper portion 112 of the crossmember 110 while the lower portion 108 of the bracket 104 may be proximate to the lower portion 114 of the crossmember 110.

The device uses one or more load cells 116. The load cell 116 may comprise a body or structure and one or more transducers that provide information indicative of a force applied to that structure. The structure of the load cell 116 may include a live end and a fixed end. The live end is affixed to a load while the fixed end is affixed to a supporting structure.

In one implementation the load cells 116 may comprise planar beam load cells 116. The structure of each planar beam load cell 116 may comprise a flat piece of material, such as metal, having strain concentration features such as slots, grooves, and so forth. For example, the flat piece of material may have a "U" shaped cut. The tab formed by the "U" may be the live end while the remaining structure surrounding the "U" is the fixed end. A strain gauge is affixed to a portion of the structure, such as at the point where the tab joins the remainder of the structure. A change in load on the live end results in a deformation of the structure of the load cell which is measured by the strain gauge. Strain gauges may be electrical, optical, acoustic, or combinations thereof. Output from the strain gauge may be used to determine weight sensor data indicative of the force that produced the deformation.

A fixed end of a first load cell 116 is affixed to the upper portion 112 of the crossmember 110. For example, the load cell 116 may be affixed to the crossmember 110 using mechanical fasteners such as screws, bolts, rivets, clips, and so forth. The upper portion 106 of the bracket 104 is arranged proximate to the live end of the first load cell 116. A first fastener 118 may be used to join the live end of the first load cell 116 to the upper portion 106 of the bracket 104. For example, as shown in FIG. 1 the first fastener 118 may comprise a bolt that is secured with a first nut 120. A first standoff 122 may be used to maintain spacing between the outer surface of the load cell 116 and the inner surface of the bracket 104.

A fixed end of a second load cell 116 is affixed to the lower portion 114 of the crossmember 110. The lower portion 108 of the bracket 104 is arranged proximate to the live end of the second load cell 116. A second fastener 118 may be used to join the live end of the second load cell 116 to the lower portion 108 of the bracket 104. For example, as shown here the second fastener 118 may comprise a bolt that is secured with a second nut 120. A second standoff 122 may be used to maintain spacing between the outer surface of the load cell 116 and the inner surface of the lower portion 108 of the bracket 104.

In other implementations other arrangements may be used. For example, the fixed end of the load cells 116 may be affixed to the bracket 104 while the live ends are affixed to the crossmember 110.

In another implementation a portion of the bracket 104 may be arranged at least partially within the crossmember 110. For example, an inner surface of the upper portion 112 of the crossmember 110 may be proximate to an outer surface of the upper portion 106 of the bracket 104 while an inner surface of the lower portion 114 of the crossmember 110 may be proximate to an outer surface of the lower portion 108 of the bracket 104.

While the bracket 104 and the crossmember 110 are depicted as having "C" shaped profiles, in other implementations other profiles may be used. For example, the crossmember 110 may be semi-circular or circular, trapezoidal, and so forth. The profiles of the bracket 104 and the crossmember 110 may also differ from one another.

Figure 2:
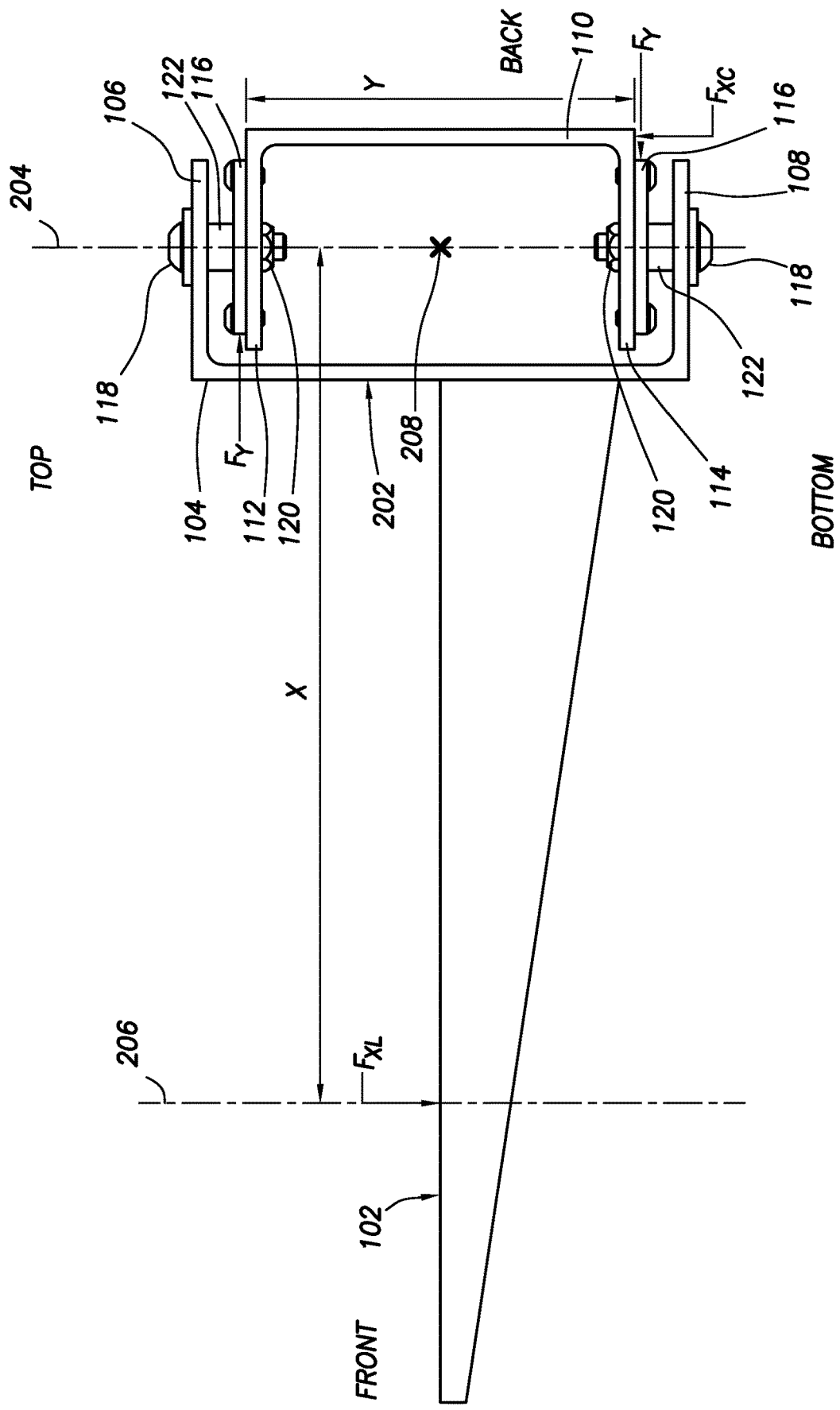
FIG. 2 illustrates a side view of the device of FIG. 1, according to one implementation.

FIG. 2 illustrates a side view of the device of FIG. 1, according to one implementation. In this view an accessory mounting face 202 of the bracket 104 is visible. The accessory mounting face 202 may include one or more engagement features to engage the accessory 102. For example, the engagement features may include slots, tabs, holes, ridges, grooves, and so forth.

As illustrated here, the first load cell 116 and the second load cell 116 may be aligned. For example, an axis 204 is shown extending through the live ends of the first load cell 116 and the second load cell 116. In other implementations the axis 204 may extend through another portion of the first load cell 116 and the second load cell 116.

In this illustration, the axis 204 extends along a long axis of the fasteners 118. The axis 204 in this implementation is perpendicular to the accessory 102. In other implementations, the axis 204 may be oriented to be vertical while the accessory 102 may extend away from the bracket 104 at an angle. For example, the accessory 102 may slope downward from the bracket 104.

The axis 204 is also perpendicular to the plane of the first load cell 116 and the plane of the second load cell 116. As shown in this implementation, the plane of the first load cell 116 and the plane of the second load cell 116 are parallel to one another.

In other implementations the first load cell 116 and the second load cell 116 may be placed in different alignments. A line extending through the live end of the first load cell 116 and the live end of the second load cell 116 may not be aligned with vertical. For example, the first load cell 116 may be displaced along a Z axis (left and right along the crossmember 110) with respect to the second load cell 116. In another example, the first load cell 116 may be displaced along the X axis (front to back with respect to the crossmember 110) with respect to the second load cell 116.

A distance X is shown extending between the axis 204 and a location 206 on the accessory 102 of a load that exerts a downward force FXL on the accessory 102. A distance Y is indicative of the distance between the load cells 116. Distances X and Y are perpendicular to one another in this illustration. An origin 208 is depicted at a midpoint of distance Y, within the crossmember 110.

The downward force FXL produces a torque or twist on the bracket 104 with respect to the origin 208. This torque produces a pair of horizontal forces on the bracket 104 with corresponding reaction forces FY by the rigid system formed by the load cells 116 affixed to the crossmember 110. A corresponding counter reaction force FXC provided by the crossmember 110 supports the device. For example, the FXC may be provided by a vertical upright of a rack, which in turn is supported by the ground.

The use of the load cells 116 at the distance Y reduces the reaction force needed to counteract the movement about the origin 208 as generated by the load FXL at the distance X. A vertical shift of FXL is enforced by the arrangement of the device. As a result, accurate measurement at the first and second load cells 116 is possible regardless of X or FXL. For example, as the location 206 moves towards or away from the origin 208, the force along the axis 204 (measured as the weight) remains the same while the reaction forces FY change. Likewise, regardless the distance X at which the load applies the force FXL, as the force FXL changes the force along the axis 204 (measured as weight) remains the same while the reaction forces FY may change.

The reaction force FY may be expressed with this equation:

$$FY = \frac{(FXL * X)}{Y} \qquad \text{Equation 1}$$

The sum of applied moments M with respect to the origin 208 may be expressed with this equation:

$$\Sigma M = FXL*X - FY*Y = 0 \qquad \text{Equation 2}$$

As the distance Y between the load cells 116 is increased, the device exhibits improved resistance to changes in X as well as FXL. The device may thus be scaled in size, increasing Y to allow for increased distances X to provide for the use of longer accessories 102 without incurring undesired movements.

Figure 3:
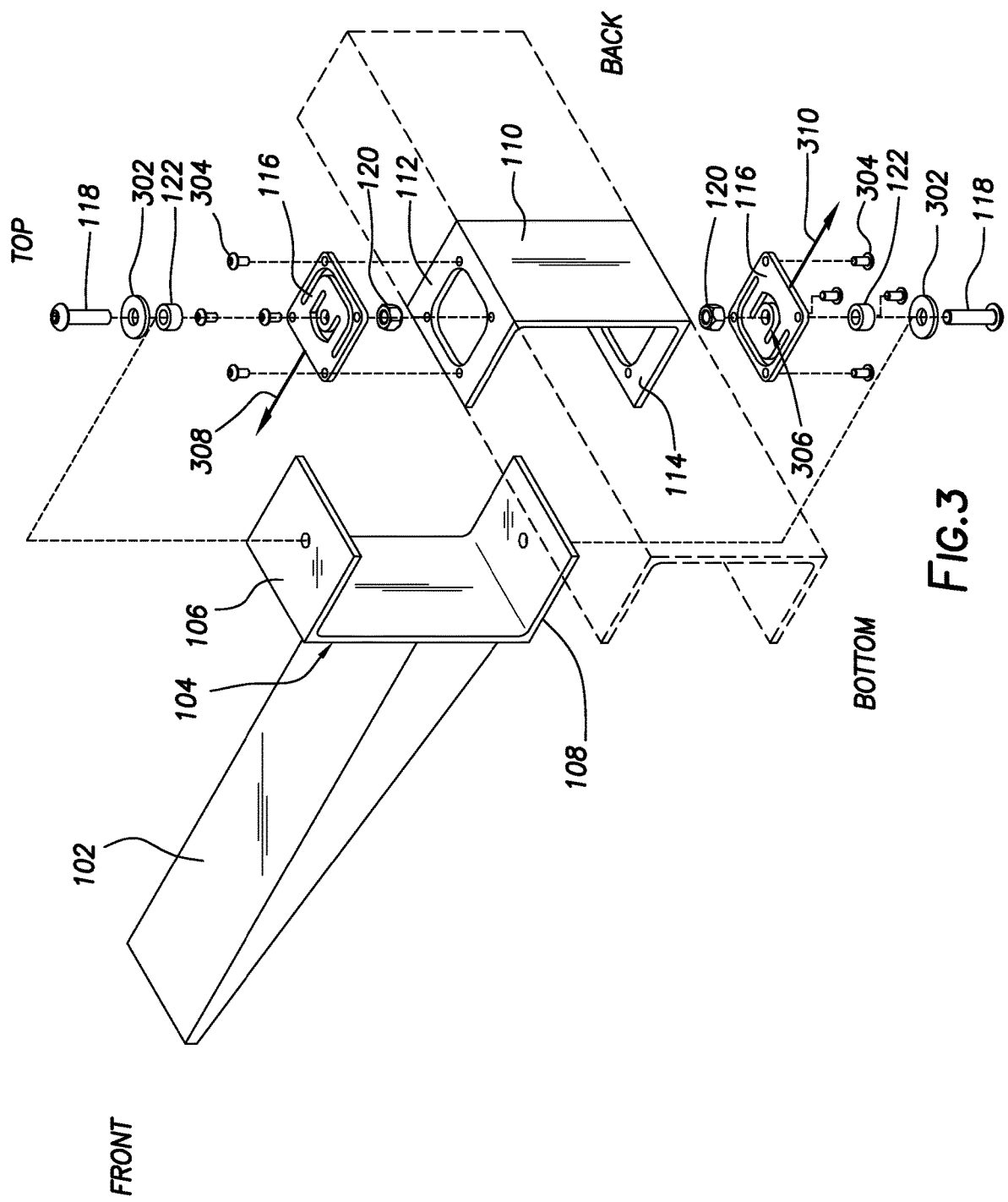
FIG. 3 illustrates an exploded view of the device of FIG. 1, according to one implementation.

FIG. 3 illustrates an exploded view of the device of FIG. 1, according to one implementation. In this view, additional components are visible. For example, a washer 302 may be used in conjunction with the fastener 118. Individual screws 304 used to attach the fixed end of the load cells 116 to the crossmember 110 are also shown.

In this illustration features of the load cells 116 are visible. For example, the load cells 116 depicted here comprise planar beam load cells with a tab 306. The tab 306 is also known as the live end of the planar beam load cell 116.

The load cells 116 may be asymmetrical in construction and may be aligned in a particular direction. The first load cell 116 is arranged in a first direction 308 while the second load cell 116 is arranged in a second direction 310. In the implementation illustrated here, the first direction 308 is opposite the second direction 310.

The load cells 116 may exhibit improved performance when installed with a particular alignment with respect to the bracket 104. The load cell 116 has a structure. For example, the load cells 116 depicted here are planar beam load cells with an overall flat structure with a plane that is described by the length and width of the structure. Relative to the plane, the forces applied to the load cell 116 may be perpendicular, parallel, or a combination thereof. For example, the force FXL may introduce a transverse or lateral force imposed on the load cell 116 as well as the weight which is perpendicular.

In some implementations one or more of the load cells 116 may be aligned in a particular direction. For example, as illustrated here the first load cell 116 that is affixed to the upper portion 112 of the crossmember 110 is affixed in the first direction 308. In this first direction 308, the tab 306 of the structure of the load cell is placed under tension when the force FXL is applied to the bracket 104. For example, the weight of the load on the accessory 102 applies a force tending to rotate the bracket 104 with respect to the origin, tipping the upper portion 106 of the bracket 104 towards the front of the device. However, the rigid nature of the components prevents substantial rotation. In particular, the rigid structure of the first load cell 116 prevents the rotation, with the reaction force FY manifesting as tension on the tab 306 within the plane of the load cell 116. Similarly, the second load cell 116 is oriented in the second direction 310, opposite the first direction 308. The second tab 306 of the second load cell 116 is also under tension when the force FXL is applied to the bracket 104. In other implementations other arrangements may be used. For example, the load cells 116 may be arranged such that the force FXL places a portion of the individual load cells 116 in compression.

In other implementations, the load cells 116 may be arranged in other directions. For example, the first direction 308 of the first load cell 116 may be parallel to a long axis of the crossmember 110.

As indicated here in dashed lines, the crossmember 110 may extend left and right. The crossmember 110 may support a plurality of other brackets 104. For example, the crossmember 110 may support a total of sixteen brackets 104, each with the corresponding components described herein.

Figure 4:
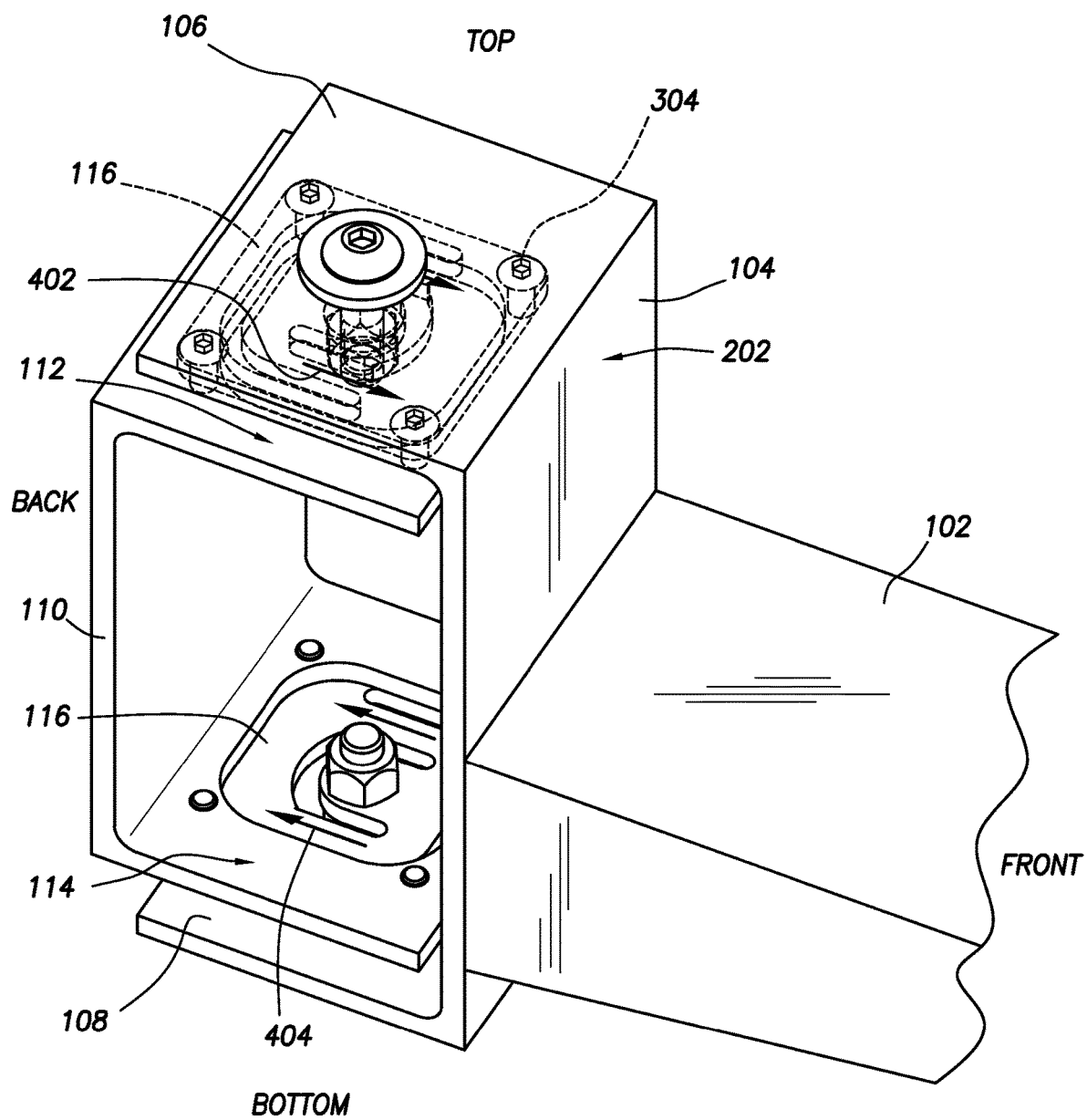
FIG. 4 illustrates a perspective view of the device of FIG. 1, according to one implementation.

FIG. 4 illustrates a perspective view of the device of FIG. 1, according to one implementation. In this view, the first load cell 116 that is beneath the upper portion 106 of the bracket 104 has been depicted using dashed lines. A force 402 on the first load cell 116 resulting from the force FXL is shown. A force 404 on the second load cell 116 resulting from the force FXL is also shown. The direction of force 402 is opposite the force 404. The forces 402 and 404 are countered by reaction force FY as described above.

As illustrated here, the direction 308 of the first load cell 116 and the direction 310 of the second load cell 116 may be arranged such that the individual tabs 306 of each load cell 116 are under tension. For example, force 402 is the force provided by the tab 306 of the first load cell 116 when the force FXL is applied.

Figure 5:
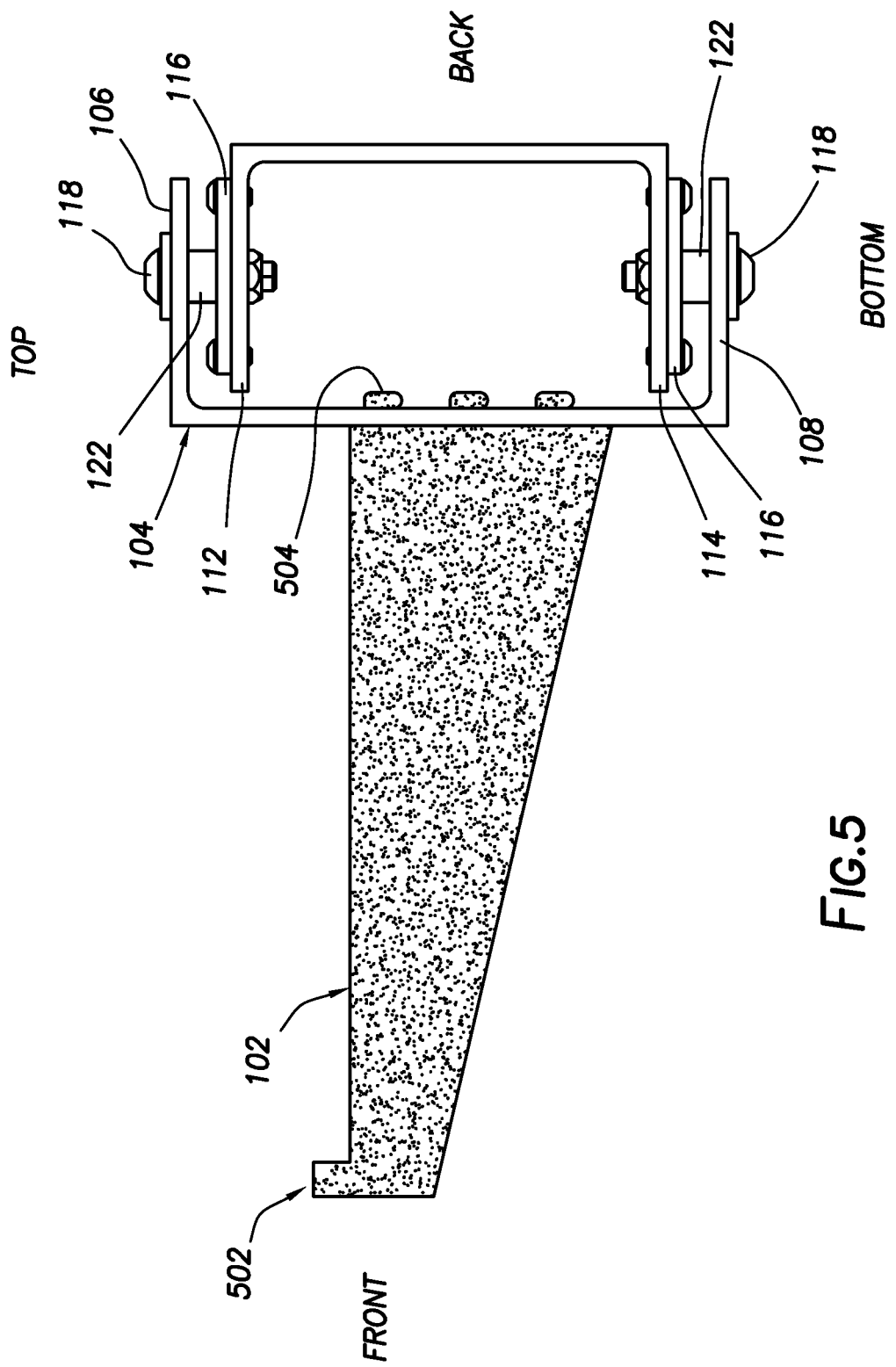
FIG. 5 illustrates a side view of the device, according to another implementation.

FIG. 5 illustrates a side view 500 of the device, according to another implementation. In this illustration the accessory 102 comprises a shelf support having a plurality of engagement features 504. The engagement features 504 of the accessory 102 may engage corresponding engagement features on the accessory mounting face 202. For example, the engagement features 504 may comprise hooks that fit within holes in the accessory mounting face 202. In other implementations the accessory 102 may be supported by engagement features on other portions of the bracket 104. For example, the bracket 104 may include engagement features on one or more of the upper portion 106 or the lower portion 108. The accessory 102 may also include an engagement feature 502, such as a tab, notch, lip, and so forth.

Figure 6:
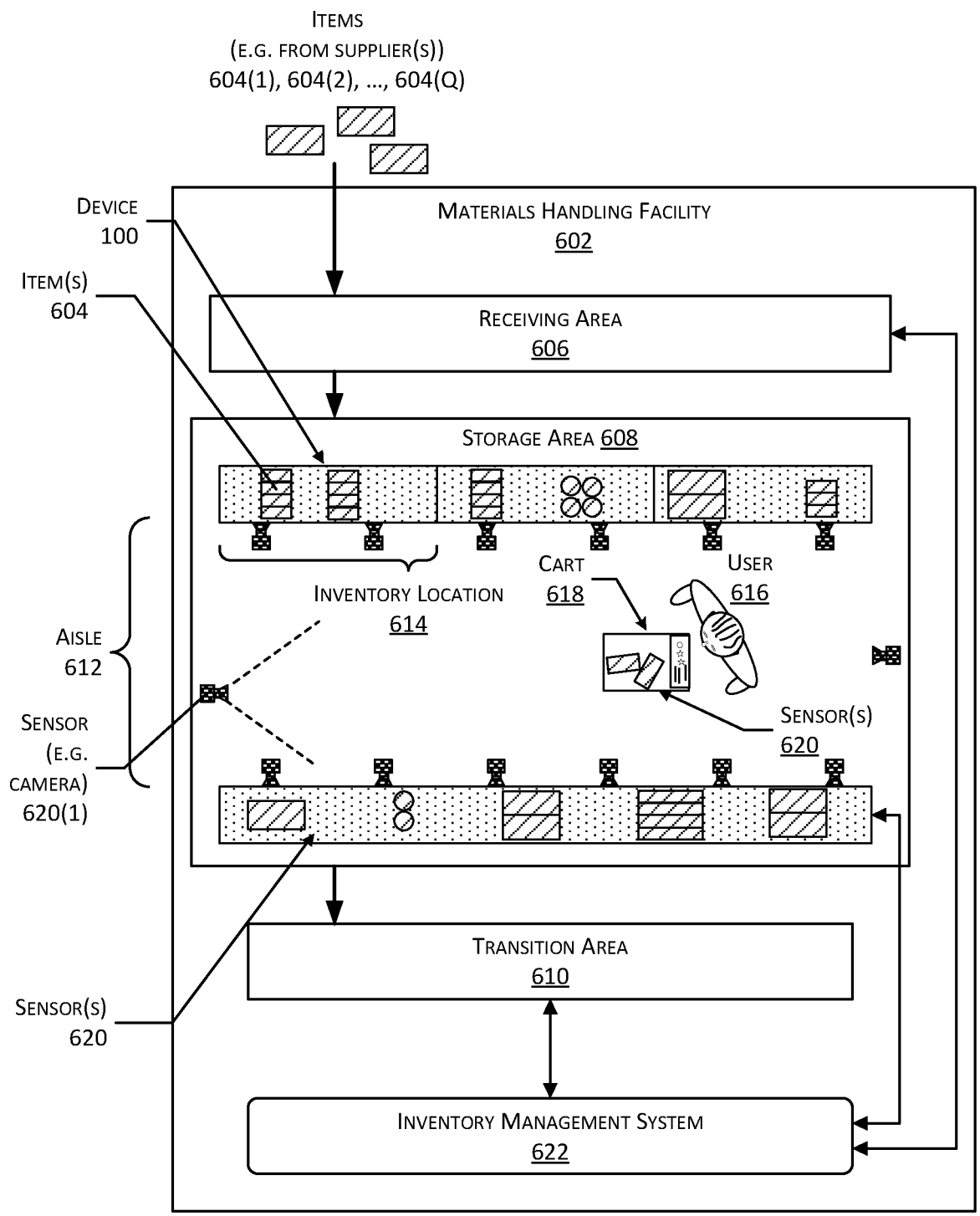
FIG. 6 is a block diagram illustrating a materials handling facility (facility) using the device, according to some implementations.

FIG. 6 is a block diagram 600 illustrating a material handling facility (facility) 602 using the device 100, according to some implementations. A facility 602 comprises one or more physical structures or areas within which one or more items 604(1), 604(2), . . . , 604(Q) may be held. The items 604 may comprise physical goods, such as books, pharmaceuticals, repair parts, electronic gear, and so forth.

The facility 602 may include one or more areas designated for different functions with regard to inventory handling. In this illustration, the facility 602 includes a receiving area 606, a storage area 608, and a transition area 610.

The receiving area 606 may be configured to accept items 604, such as from suppliers, for intake into the facility 602. For example, the receiving area 606 may include a loading dock at which trucks or other freight conveyances unload the items 604. In some implementations, the items 604 may be processed, at the receiving area 606, to generate at least a portion of item data as discussed below. For example, an item 604 may be weighed, imaged or otherwise scanned to develop reference images or representations of the item 604 at the receiving area 606.

The storage area 608 is configured to store the items 604. The storage area 608 may be arranged in various physical configurations. In one implementation, the storage area 608 may include one or more aisles 612. The aisle 612 may be configured with, or defined by, inventory locations 614 on one or both sides of the aisle 612. The inventory locations 614 may include one or more of a platform, a rack, a case, a cabinet, a bin, a floor location, or other suitable storage mechanisms for holding, supporting, or storing the items 604. For example, the inventory locations 614 may comprise racks that support one or more devices 100 with accessories 102 to hold items 604. The inventory locations 614 may be affixed to the floor or another portion of the structure of the facility 602. The inventory locations 614 may also be movable such that the arrangements of aisles 612 may be reconfigurable. In some implementations, the inventory locations 614 may be configured to move independently of an outside operator. For example, the inventory locations 614 may comprise a platform with a power source and a motor, operable by a computing device to allow the platform to move from one location within the facility 602 to another.

One or more users 616 and carts 618 or other material handling apparatus may move within the facility 602. For example, the user 616 may move about within the facility 602 to pick or place the items 604 in various inventory locations 614, placing them in the cart 618 for ease of transport. The cart 618 is configured to carry or otherwise transport one or more items 604. For example, the cart 618 may include a basket, bag, bin, and so forth. In other implementations, other material handling apparatuses such as robots, forklifts, cranes, aerial drones, and so forth, may move about the facility 602 picking, placing, or otherwise moving the items 604. For example, a robot may pick an item 604 from a first inventory location 614(1) and move the item 604 to a second inventory location 614(2).

The facility 602 may include one or more sensors 620. For example, the sensors 620 may provide sensor data such as weight sensor data from the device(s) 100, image data from cameras, and so forth.

While the storage area 608 is depicted as having one or more aisles 612, sensors 620, inventory locations 614 storing the items 604, and so forth, it is understood that the receiving area 606, the transition area 610, or other areas of the facility 602 may be similarly equipped. Furthermore, the arrangement of the various areas within the facility 602 is depicted functionally rather than schematically. For example, in some implementations, multiple different receiving areas 606, storage areas 608, and transition areas 610 may be interspersed rather than segregated in the facility 602.

The facility 602 may include, or be coupled to, an inventory management system 622. The inventory management system 622 is configured to interact with the user 616 or devices such as the sensors 620, robots, material handling equipment, computing devices, and so forth, in one or more of the receiving area 606, the storage area 608, or the transition area 610.

During operation of the facility 602, the sensor data based on output from the devices 100 or other sensors 620 may be provided to the inventory management system 622. The sensors 620 may include, but are not limited to, cameras 620(1), touch sensors 620(6), and so forth. The sensors 620 may be stationary or mobile, relative to the facility 602. For example, the facility 602 may include cameras 620(1) to obtain images of the user 616 or other objects in the facility 602. In another example, the inventory locations 614 may contain cameras 620(1) to acquire images of picking or placement of items 604 on shelves, and so forth. The sensors 620 are described in more detail below with regard to FIG. 7.

The inventory management system 622 or other systems may use the sensor data to determine the location of objects within the facility 602, movement of the objects, or provide other functionality. Objects may include, but are not limited to, items 604, users 616, carts 618, and so forth. For example, a series of images acquired by the cameras 620(1) may indicate removal by the user 616 of an item 604 from a particular location at the inventory location 614 and placement of the item 604 on or at least partially within the cart 618.

The facility 602 may be configured to receive different kinds of items 604 from various suppliers and to store them until a customer orders or retrieves one or more of the items 604. A general flow of items 604 through the facility 602 is indicated by the arrows of FIG. 6. Specifically, as illustrated in this example, items 604 may be received from one or more suppliers, such as manufacturers, distributors, wholesalers, and so forth, at the receiving area 606. In various implementations, the items 604 may include merchandise, commodities, perishables, or any suitable type of item 604, depending on the nature of the enterprise that operates the facility 602.

Upon being received from a supplier at the receiving area 606, the items 604 may be prepared for storage in the storage area 608. For example, in some implementations, items 604 may be unpacked or otherwise rearranged. The inventory management system 622 may include one or more software applications executing on a computer system to provide inventory management functions. These inventory management functions may include maintaining information indicative of the type, quantity, condition, cost, location, weight, or any other suitable parameters with respect to the items 604. The items 604 may be stocked, managed, or dispensed in terms of countable units, individual units, or multiple units, such as packages, cartons, crates, pallets, or other suitable aggregations. Alternatively, some items 604, such as bulk products, commodities, and so forth, may be stored in continuous or arbitrarily divisible amounts that may not be inherently organized into countable units. Such items 604 may be managed in terms of a measurable quantity such as units of length, area, volume, weight, time, duration, or other dimensional properties characterized by units of measurement. Generally speaking, a quantity of an item 604 may refer to either a countable number of individual or aggregate units of an item 604 or a measurable amount of an item 604, as appropriate.

After arriving through the receiving area 606, items 604 may be stored within the storage area 608. In some implementations, like items 604 may be stored or displayed together in the inventory locations 614 such as in accessories 102. In this implementation, items 604 of a single type are stored in a particular inventory location 614. In other implementations, different types of items 604 may be stored in different inventory locations 614. For example, to optimize retrieval of certain items 604 having frequent turnover within a large physical facility 602, those items 604 may be stored in several different inventory locations 614 to reduce congestion during picking that might occur at a single inventory location 614.

When a customer order specifying one or more items 604 is received, or as a user 616 progresses through the facility 602, the corresponding items 604 may be selected or "picked" from the inventory locations 614 containing those items 604. In various implementations, item picking may range from manual to completely automated picking. For example, in one implementation, a user 616 may have a list of items 604 they desire and may progress through the facility 602 picking items 604 from inventory locations 614 within the storage area 608 and placing those items 604 into a cart 618. In other implementations, employees of the facility 602 may pick items 604 using written or electronic pick lists derived from customer orders. These picked items 604 may be placed into the cart 618 as the employee progresses through the facility 602.

After items 604 have been picked, the items 604 may be processed at a transition area 610. The transition area 610 may be any designated area within the facility 602 where items 604 are transitioned from one location to another or from one entity to another. For example, the transition area 610 may be a packing station within the facility 602. When the item 604 arrives at the transition area 610, the items 604 may be transitioned from the storage area 608 to the packing station. Information about the transition may be maintained by the inventory management system 622.

In another example, if the items 604 are departing the facility 602, a list of the items 604 may be obtained and used by the inventory management system 622 to transition responsibility for, or custody of, the items 604 from the facility 602 to another entity. For example, a carrier may accept the items 604 for transport with that carrier accepting responsibility for the items 604 indicated in the list. In another example, a user 616 may purchase or rent the items 604 and remove the items 604 from the facility 602. During use of the facility 602, the user 616 may move about the facility 602 to perform various tasks, such as picking or placing the items 604 in the inventory locations 614.

To facilitate operation of the facility 602, the inventory management system 622 is configured to use the sensor data such as the item data, physical layout data, and so forth, to generate interaction data.

The interaction data may provide information about an interaction, such as a pick of an item 604 from the inventory location 614, a place of an item 604 to the inventory location 614, a touch made to an item 604 at the inventory location 614, a gesture associated with an item 604 at the inventory location 614, and so forth. The interaction data may include one or more of the type of interaction, interaction location identifier indicative of where from the inventory location 614 the interaction took place, item identifier, quantity change to the item 604, user identifier, and so forth. The interaction data may then be used to further update the item data. For example, the quantity of items 604 on hand at a particular lane on the platform may be changed based on an interaction that picks or places one or more items 604.

In one implementation, the sensor data may be received by the inventory management module. The sensor data may be processed to determine a weight change of +230 g occurred at a device at position 2 at inventory location 614(73). The item data may indicate that items 604 of the type "12 oz can of Brand X dogfood" are stowed at this position and have an expected weight of 234 grams. Based on the sensor data a hypothesis may be generated that indicates "Qty+1 (return) of 12 oz can of Brand X dogfood to position 2 at inventory location 614(73)". If the hypothesis has a confidence value that exceeds a threshold value, the hypothesis may be deemed to represent the interaction which took place. As a result, interaction data may be generated that is representative of this interaction.

As described above, the inventory management system 622 may perform other operations, determining inventory to restock, determining user billing data, and so forth.

Figure 7:
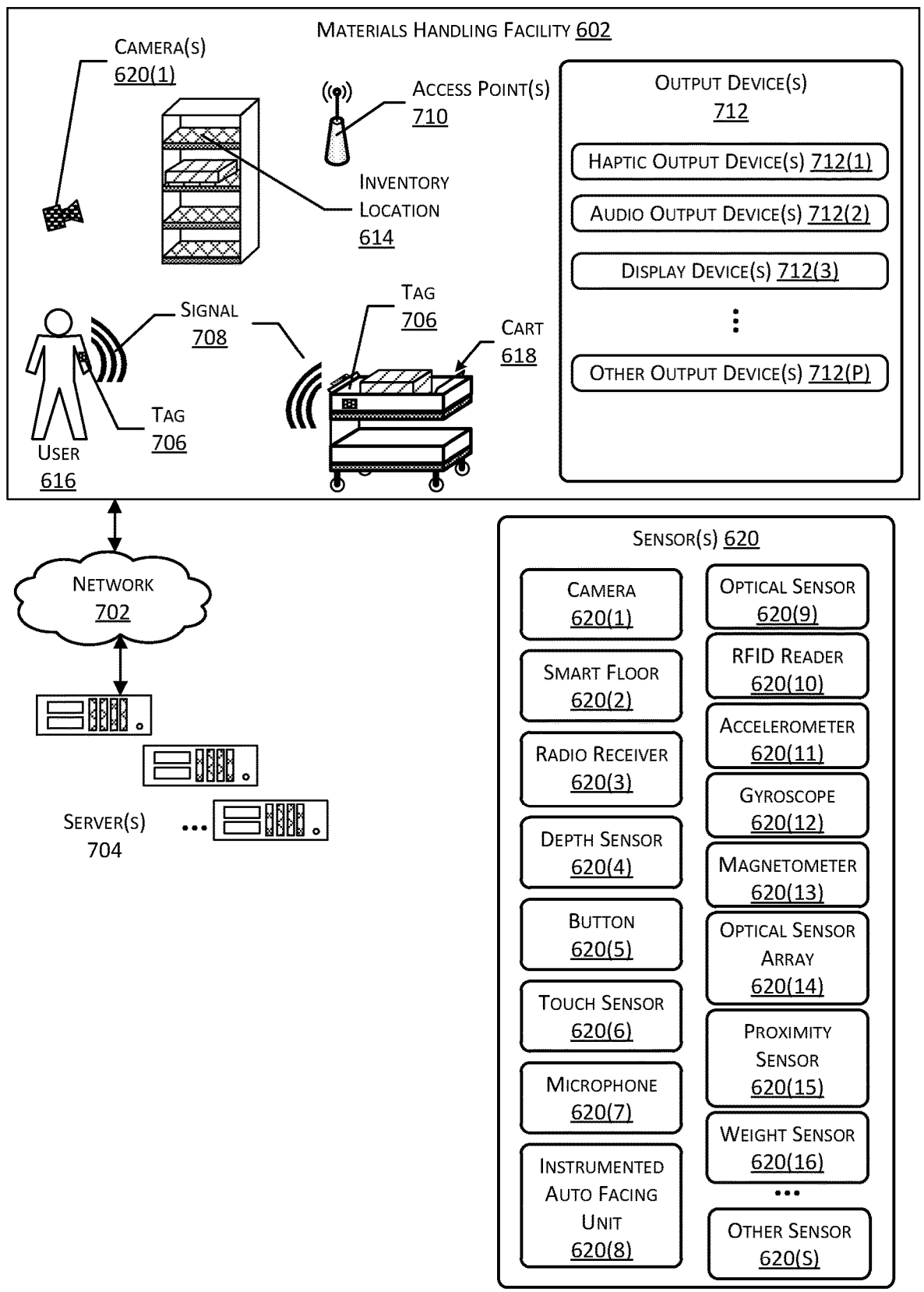
FIG. 7 is a block diagram illustrating additional details of the facility, according to some implementations.

FIG. 7 is a block diagram 700 illustrating additional details of the facility 602, according to some implementations. The facility 602 may be connected to one or more networks 702, which in turn connect to one or more computing devices, such as servers 704. The network 702 may include private networks such as an institutional or personal intranet, public networks such as the Internet, or a combination thereof. The network 702 may utilize wired technologies (e.g., wires, fiber optic cables, and so forth), wireless technologies (e.g., radio frequency, infrared, acoustic, optical, and so forth), or other connection technologies. The network 702 is representative of any type of communication network, including one or more of data networks or voice networks. The network 702 may be implemented using wired infrastructure (e.g., copper cable, fiber optic cable, and so forth), a wireless infrastructure (e.g., cellular, microwave, satellite, and so forth), or other connection technologies.

The servers 704 may be configured to execute one or more modules or software applications associated with the inventory management system 622 or other systems. While the servers 704 are illustrated as being in a location outside of the facility 602, in other implementations, at least a portion of the servers 704 may be located at the facility 602. The servers 704 are discussed in more detail below with regard to FIG. 8.

The user 616, the carts 618, items 604, or other objects in the facility 602 may be equipped with one or more tags 706. The tags 706 may be configured to emit a signal 708. In one implementation, the tag 706 may be a radio frequency identification (RFID) tag 706 configured to emit a RF signal 708 upon activation by an external signal. For example, the external signal may comprise a radio frequency signal or a magnetic field configured to energize or activate the RFID tag 706. In another implementation, the tag 706 may comprise a transmitter and a power source configured to power the transmitter. For example, the tag 706 may comprise a Bluetooth Low Energy (BLE) transmitter and battery. In other implementations, the tag 706 may use other techniques to indicate presence of the tag 706. For example, an acoustic tag 706 may be configured to generate an ultrasonic signal 708, which is detected by corresponding acoustic receivers. In yet another implementation, the tag 706 may be configured to emit an optical signal 708.

The inventory management system 622 may be configured to use the tags 706 for one or more of identification of the object, determining a location of the object, and so forth. For example, the user 616 may wear tags 706, the carts 618 may have tags 706 affixed, items 604 may have tags 706 affixed to their packaging, and so forth, which may be read and, based at least in part on signal strength, used to determine one or more of identity or location.

Generally, the inventory management system 622 or other systems associated with the facility 602 may include any number and combination of input components, output components, and servers 704.

The one or more sensors 620 may be arranged at one or more locations within the facility 602. For example, the sensors 620 may be mounted on or within a floor, wall, at a ceiling, at an inventory location 614, on a cart 618, may be carried or worn by a user 616, and so forth.

The sensors 620 may include one or more cameras 620(1) or other imaging sensors. The one or more cameras 620(1) may include imaging sensors configured to acquire images of a scene. The cameras 620(1) are configured to detect light in one or more wavelengths including, but not limited to, terahertz, infrared, visible, ultraviolet, and so forth. The cameras 620(1) may comprise charge coupled devices (CCD), complementary metal oxide semiconductor (CMOS) devices, microbolometers, and so forth. The inventory management system 622 may use image data acquired by the cameras 620(1) during operation of the facility 602. For example, the inventory management system 622 may identify items 604, users 616, carts 618, and so forth, based at least in part on their appearance within the image data acquired by the cameras 620(1). The cameras 620(1) may be mounted in various locations within the facility 602. For example, cameras 620(1) may be mounted overhead, on inventory locations 614, may be worn or carried by users 616, may be affixed to carts 618, and so forth.

The sensors 620 may include a smart floor 620(2). The smart floor 620(2) is able to provide information about the location of objects, such as users 616, carts 618, and so forth. This information may include identifying the object, determining a location of the object, tracking the object, and so forth. The smart floor 620(2) may utilize smart floor devices that comprise one or more of transmitters or receivers that radiate or receive electromagnetic signals from antennas located at or underneath the floor. Based on information about what antenna radiated a signal and what antenna acquired the signal, information about an object on or above the floor may be determined. For example, the smart floor 620(2) may comprise sensing elements, or segments. Each segment may include an antenna that is coupled to one or more of a transmitter or a receiver. During operation, the segment may transmit an electromagnetic signal 708 that is radiated by the antenna, receive an electromagnetic signal 708 that is acquired by the antenna, or both. In some implementations the smart floor 620(2) may operate as a physically large touch sensor that is deployed at floor level. The electromagnetic signals provide information about the presence of an object thereon. For example, the segments may electromagnetically couple to objects that are close by, allowing for the detection of objects that are either in contact with the floor or above the floor. In some implementations, instead of or in addition to the visual tracking of the object, the smart floor 620(2) may be used to provide object representation movement data. For example, the output from the segments obtained during a particular window of time may be processed in a fashion similar to the image data.

One or more radio receivers 620(3) may also be included as sensors 620. In some implementations, the radio receivers 620(3) may be part of transceiver assemblies. The radio receivers 620(3) may be configured to acquire RF signals 708 associated with RFID, Wi-Fi, Bluetooth, ZigBee, 2G, 3G, 4G, LTE, or other wireless data transmission technologies. The radio receivers 620(3) may provide information associated with data transmitted via radio frequencies, signal strength of RF signals 708, and so forth. For example, information from the radio receivers 620(3) may be used by the inventory management system 622 to determine a location of an RF source, such as a transmitter carried by the user 616, a transmitter on the cart 618, a tag 706 on the item 604, and so forth.

One or more depth sensors 620(4) may also be included in the sensors 620. The depth sensors 620(4) are configured to acquire spatial or three-dimensional (3D) data, such as depth information, about objects within a field-of-view (FOV). The depth sensors 620(4) may include range cameras, lidar systems, sonar systems, radar systems, structured light systems, stereo vision systems, optical interferometry systems, and so forth. The inventory management system 622 may use the 3D data acquired by the depth sensors 620(4) to identify objects, determine a location of an object in 3D real space, identify a user 616, and so forth.

One or more buttons 620(5) may be configured to accept input from the user 616. The buttons 620(5) may comprise mechanical, capacitive, optical, or other mechanisms. For example, the buttons 620(5) may comprise mechanical switches configured to accept an applied force from a touch of the user 616 to generate an input signal. The inventory management system 622 may use data from the buttons 620(5) to receive information from the user 616. For example, the cart 618 may be configured with a button 620(5) to accept input from the user 616 and send information indicative of the input to the inventory management system 622.

The sensors 620 may include one or more touch sensors 620(6). The touch sensors 620(6) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 622 may use data from the touch sensors 620(6) to receive information from the user 616. For example, the touch sensor 620(6) may be integrated with the cart 618 to provide a touchscreen with which the user 616 may select from a menu one or more particular items 604 for picking, enter a manual count of items 604 at an inventory location 614, and so forth.

One or more microphones 620(7) may be configured to acquire information indicative of sound present in the environment. In some implementations, arrays of microphones 620(7) may be used. These arrays may implement beamforming techniques to provide for directionality of gain. The inventory management system 622 may use the one or more microphones 620(7) to acquire information from acoustic tags 706, accept voice input from the user 616, determine ambient noise level, and so forth.

The sensors 620 may include instrumented auto facing units (IAFUs) 620(8). The IAFU 620(8) may comprise a position sensor configured to provide data indicative of displacement of a pusher. As an item 604 is removed from the IAFU 620(8), the pusher moves, such as under the influence of a spring, and pushes the remaining items 604 in the IAFU 620(8) to the front of the inventory location 614. By using data from the position sensor, and given item data such as a depth of an individual item 604, a count may be determined, based on a change in position data. For example, if each item 604 is 1 inch deep, and the position data indicates a change of 7 inches, the quantity held by the IAFU 620(8) may have changed by 7 items 604. This count information may be used to confirm or provide a cross check for a count obtained by other means, such as analysis of the sensor data from the weight sensors 620(16).

The sensors 620 may include one or more optical sensors 620(9). The optical sensors 620(9) may be configured to provide data indicative of one or more of color or intensity of light impinging thereupon. For example, the optical sensor 620(9) may comprise a photodiode and associated circuitry configured to generate a signal 708 or data indicative of an incident flux of photons. As described below, the optical sensor array 620(14) may comprise a plurality of the optical sensors 620(9). The optical sensors 620(9) may include photodiodes, photoresistors, photovoltaic cells, quantum dot photoconductors, bolometers, pyroelectric infrared detectors, and so forth. For example, the optical sensor 620(9) may use germanium photodiodes to detect infrared light.

One or more radio frequency identification (RFID) readers 620(10), near field communication (NFC) systems, and so forth, may be included as sensors 620. For example, the RFID readers 620(10) may be configured to read the RF tags 706. Information acquired by the RFID reader 620(10) may be used by the inventory management system 622 to identify an object associated with the RF tag 706 such as the item 604, the user 616, the cart 618, and so forth. For example, based on information from the RFID readers 620(10) detecting the RF tag 706 at a particular inventory location, an item 604 being placed or picked may be determined.

The sensors 620 may include one or more accelerometers 620(11), which may be worn or carried by the user 616, mounted to the cart 618, and so forth. The accelerometers 620(11) may provide information such as the direction and magnitude of an imposed acceleration. Data such as rate of acceleration, determination of changes in direction, speed, and so forth, may be determined using the accelerometers 620(11).

A gyroscope 620(12) may provide information indicative of rotation of an object affixed thereto. For example, the cart 618 or other objects may be equipped with a gyroscope 620(12) to provide data indicative of a change in orientation of the object.

A magnetometer 620(13) may be used to determine an orientation by measuring ambient magnetic fields, such as the terrestrial magnetic field. The magnetometer 620(13) may be worn or carried by the user 616, mounted to the cart 618, and so forth. For example, the magnetometer 620(13) mounted to the cart 618 may act as a compass and provide information indicative of which direction the cart 618 is oriented.

An optical sensor array 620(14) may comprise one or optical sensors 620(9). The optical sensors 620(9) may be arranged in a regular, repeating, or periodic two-dimensional arrangement such as a grid. The optical sensor array 620(14) may generate image data. For example, the optical sensor array 620(14) may be arranged within or below an inventory location 614 and obtain information about shadows of items 604, hand of the user 616, and so forth.

The sensors 620 may include proximity sensors 620(15) used to determine presence of an object, such as the user 616, the cart 618, and so forth. The proximity sensors 620(15) may use optical, electrical, ultrasonic, electromagnetic, or other techniques to determine a presence of an object. In some implementations, the proximity sensors 620(15) may use an optical emitter and an optical detector to determine proximity. For example, an optical emitter may emit light, a portion of which may then be reflected by the object back to the optical detector to provide an indication that the object is proximate to the proximity sensor 620(15). In other implementations, the proximity sensors 620(15) may comprise a capacitive proximity sensor 620(15) configured to provide an electrical field and determine a change in electrical capacitance due to presence or absence of an object within the electrical field.

The proximity sensors 620(15) may be configured to provide sensor data indicative of one or more of a presence or absence of an object, a distance to the object, or characteristics of the object. An optical proximity sensor 620(15) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 620 such as a camera 620(1). Based on an apparent distance between the features of the structured light pattern, the distance to the object may be calculated. Other techniques may also be used to determine distance to the object. In another example, the color of the reflected light may be used to characterize the object, such as skin, clothing, cart 618, and so forth.

The one or more weight sensors 620(16) are configured to measure the weight of a load, such as the item 604, the cart 618, or other objects. The weight sensors 620(16) may be configured to measure the weight of the load at one or more of the inventory locations 614, the cart 618, on the floor of the facility 602, and so forth. For example, the device 100 may include a plurality of weight sensors 620(16). The weight sensors 620(16) may include one or more sensing mechanisms to determine the weight of a load. These sensing mechanisms may include piezoresistive devices, piezoelectric devices, electrically resistive device, capacitive devices, electromagnetic devices, optical devices, potentiometric devices, microelectromechanical devices, and so forth. The sensing mechanisms of weight sensors 620(16) may operate as transducers that generate one or more signals based on an applied force, such as that of the load due to gravity. For example, the weight sensor 620(16) may comprise a strain gauge and a structural member that deforms slightly when weight is applied. The strain gauge may be a resistive strain gauge, optical strain gauge, capacitive strain gauge, and so forth. By measuring a change in the characteristic of the strain gauge, such as a change in electrical capacitance or resistance, a change in polarization of light in an optical fiber, and so forth, the weight may be determined. Instead of a strain gauge, the weight sensor 620(16) may use a piezoelectric element that generates a voltage when a load is applied or removed. In another example, the weight sensor 620(16) may comprise a force sensing resistor (FSR). The FSR may comprise a resilient material that changes one or more electrical characteristics when compressed. For example, the electrical resistance of a particular portion of the FSR may decrease as the particular portion is compressed. In another example, the weight sensor 620(16) may comprise an optical fiber. As strain is applied to the optical fiber, changes to light passing through the fiber may be detected and used to determine an applied force, such as weight. In yet another example, the weight sensor 620(16) may comprise an ultrasonic transducer that is used to detect changes in acoustic transmission in a material in response to an applied force on the material.

The inventory management system 622 may use the data acquired by the weight sensors 620(16) to identify an object, determine a change in the quantity of objects, determine a location of an object, maintain shipping records, and so forth.

The sensors 620 may include other sensors 620(S) as well. For example, the other sensors 620(S) may include light curtains, ultrasonic rangefinders, thermometers, barometric sensors, hygrometers, and so forth.

In some implementations, the sensors 620 may include hardware processors, memory, and other elements configured to perform various functions. For example, the cameras 620(1) may be configured to generate image data, send the image data to another device such as the server 704, and so forth.

The facility 602 may include one or more access points 710 configured to establish one or more wireless networks. The access points 710 may use Wi-Fi, NFC, Bluetooth, or other technologies to establish wireless communications between a device and the network 702. The wireless networks allow the devices to communicate with one or more of the sensors 620, the inventory management system 622, the tags 706, a communication device of the cart 618, or other devices.

Output devices 712 may also be provided in the facility 602. The output devices 712 are configured to generate signals 708, which may be perceived by the user 616 or detected by the sensors 620. In some implementations, the output devices 712 may be used to provide illumination of the optical sensor array 620(14).

Haptic output devices 712(1) are configured to provide a signal 708 that results in a tactile sensation to the user 616. The haptic output devices 712(1) may use one or more mechanisms such as electrical stimulation or mechanical displacement to provide the signal 708. For example, the haptic output devices 712(1) may be configured to generate a modulated electrical signal, which produces an apparent tactile sensation in one or more fingers of the user 616. In another example, the haptic output devices 712(1) may comprise piezoelectric or rotary motor devices configured to provide a vibration, which may be felt by the user 616.

One or more audio output devices 712(2) may be configured to provide acoustic output. The acoustic output includes one or more of infrasonic sound, audible sound, or ultrasonic sound. The audio output devices 712(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 712(3) may be configured to provide output, which may be seen by the user 616 or detected by a light-sensitive sensor such as a camera 620(1) or an optical sensor 620(9). In some implementations, the display devices 712(3) may be configured to produce output in one or more of infrared, visible, or ultraviolet light. The output may be monochrome or in color. The display devices 712(3) may be one or more of emissive, reflective, microelectromechanical, and so forth. An emissive display device 712(3), such as using LEDs, is configured to emit light during operation. In comparison, a reflective display device 712(3), such as using an electrophoretic element, relies on ambient light to present an image. Backlights or front lights may be used to illuminate non-emissive display devices 712(3) to provide visibility of the output in conditions where the ambient light levels are low.

The display devices 712(3) may be located at various points within the facility 602. For example, the addressable displays may be located on inventory locations 614, carts 618, on the floor of the facility 602, and so forth.

Other output devices 712(P) may also be present. For example, the other output devices 712(P) may include scent/odor dispensers, document printers, 3D printers or fabrication equipment, and so forth.

Figure 8:
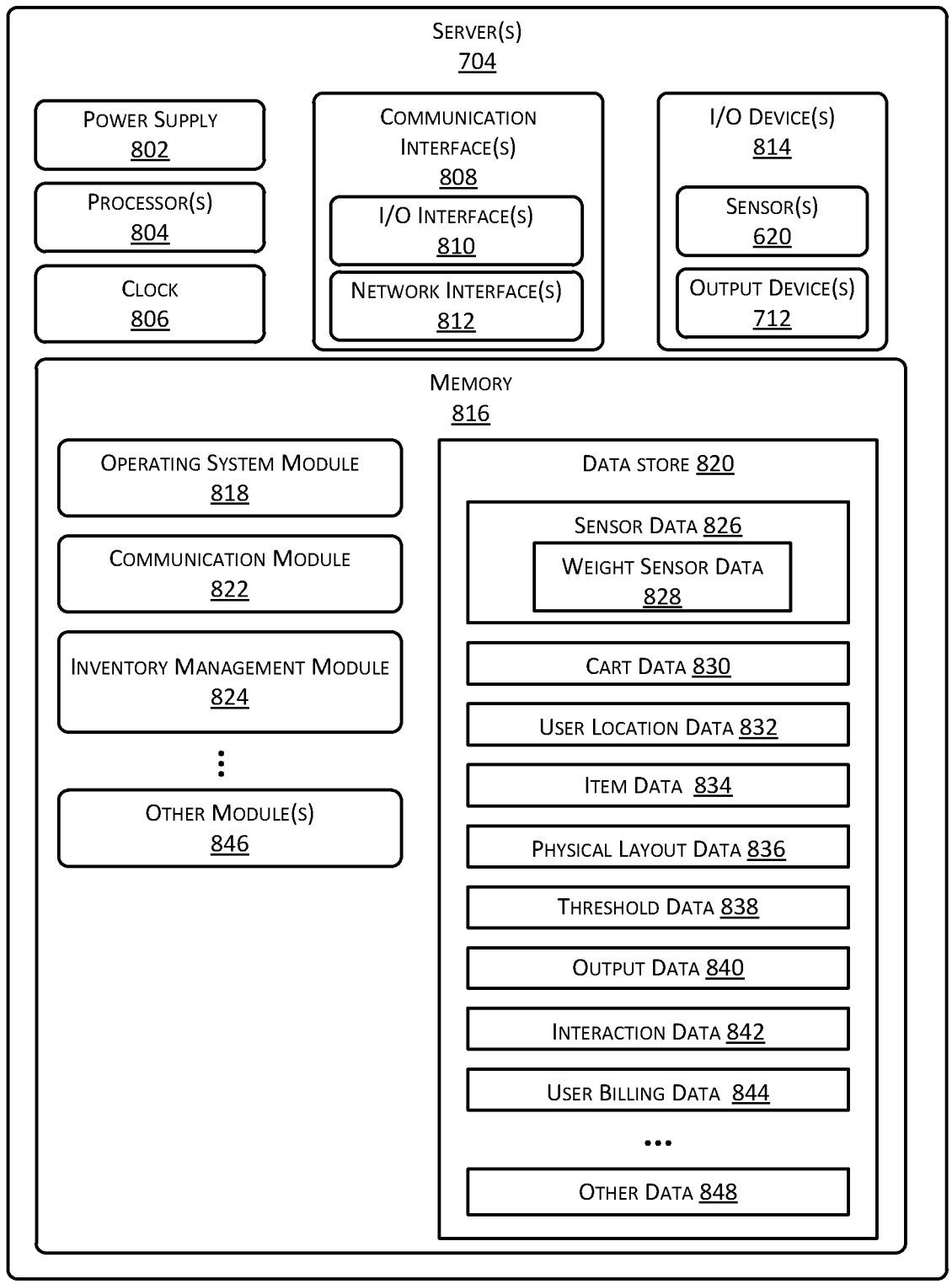
FIG. 8 is a block diagram of a server to support operation of the facility, according to some implementations.

FIG. 8 illustrates a block diagram 800 of a server 704 configured to support operation of the facility 602, according to some implementations. The server 704 may be physically present at the facility 602, may be accessible by the network 702, or a combination of both. The server 704 does not require end-user knowledge of the physical location and configuration of the system that delivers the services. Common expressions associated with the server 704 may include "on-demand computing", "software as a service (SaaS)", "platform computing", "network-accessible platform", "cloud services", "data centers", and so forth. Services provided by the server 704 may be distributed across one or more physical or virtual devices.

One or more power supplies 802 may be configured to provide electrical power suitable for operating the components in the server 704. The one or more power supplies 802 may comprise batteries, capacitors, fuel cells, photovoltaic cells, wireless power receivers, conductive couplings suitable for attachment to an external power source such as provided by an electric utility, and so forth. The server 704 may include one or more hardware processors 804 (processors) configured to execute one or more stored instructions. The processors 804 may comprise one or more cores. One or more clocks 806 may provide information indicative of date, time, ticks, and so forth. For example, the processor 804 may use data from the clock 806 to associate a particular interaction with a particular point in time.

The server 704 may include one or more communication interfaces 808 such as input/output (I/O) interfaces 810, network interfaces 812, and so forth. The communication interfaces 808 enable the server 704, or components thereof, to communicate with other devices or components. The communication interfaces 808 may include one or more I/O interfaces 810. The I/O interfaces 810 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 810 may couple to one or more I/O devices 814. The I/O devices 814 may include input devices such as one or more of a sensor 620, keyboard, mouse, scanner, and so forth. The I/O devices 814 may also include output devices 712 such as one or more of a display device 712(3), printer, audio speakers, and so forth. In some embodiments, the I/O devices 814 may be physically incorporated with the server 704 or may be externally placed.

The network interfaces 812 may be configured to provide communications between the server 704 and other devices, such as the carts 618, routers, access points 710, and so forth. The network interfaces 812 may include devices configured to couple to personal area networks (PANS), local area networks (LANs), wireless local area networks (WLANS), wide area networks (WANs), and so forth. For example, the network interfaces 812 may include devices compatible with Ethernet, Wi-Fi, Bluetooth, ZigBee, and so forth.

The server 704 may also include one or more buses or other internal communications hardware or software that allow for the transfer of data between the various modules and components of the server 704.

As shown in FIG. 8, the server 704 includes one or more memories 816. The memory 816 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 816 provides storage of computer-readable instructions, data structures, program modules, and other data for the operation of the server 704. A few example functional modules are shown stored in the memory 816, although the same functionality may alternatively be implemented in hardware, firmware, or as a system on a chip (SoC).

The memory 816 may include at least one operating system (OS) module 818. The OS module 818 is configured to manage hardware resource devices such as the I/O interfaces 810, the I/O devices 814, the communication interfaces 808, and provide various services to applications or modules executing on the processors 804. The OS module 818 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 816 may be a data store 820 and one or more of the following modules. These modules may be executed as foreground applications, background tasks, daemons, and so forth. The data store 820 may use a flat file, database, linked list, tree, executable code, script, or other data structure to store information. In some implementations, the data store 820 or a portion of the data store 820 may be distributed across one or more other devices including the servers 704, network attached storage devices, and so forth.

A communication module 822 may be configured to establish communications with one or more of the carts 618, sensors 620, display devices 712(3), other servers 704, or other devices. The communications may be authenticated, encrypted, and so forth.

The memory 816 may store an inventory management module 824. The inventory management module 824 is configured to provide the inventory functions as described herein with regard to the inventory management system 622. For example, the inventory management module 824 may track items 604 between different inventory locations 614, to and from the carts 618, generate restocking orders, direct operation of robots within the facility 602, and so forth. During operation the inventory management module 824 may access sensor data 826 or information based on the sensor data 826.

Information used by the inventory management module 824 may be stored in the data store 820. For example, the data store 820 may be used to store sensor data 826 such as weight sensor data 828, cart data 830, user location data 832, item data 834, physical layout data 836, threshold data 838, output data 840, interaction data 842, user billing data 844, and so forth.

Output from the devices 100 may be used to determine the weight sensor data 828. For example, the weight sensor data 828 may comprise information indicative of a weight at a particular time for a particular bracket 104.

The cart data 830 comprises information about the items 604 that are determined to be in the custody of the user 616. For example, the cart data 830 may indicate the items 604 that are within the cart 618 that is associated with the account of the user 616, currently being carried by the user 616, and so forth. The cart data 830 may be based at least in part on the interaction data 842. For example, the interaction data 842 may be associated with a particular user 616, changing the contents of the cart data 830 based on the interaction.

The inventory management module 824 may generate the user location data 832 that is indicative of the location of the user 616 within the facility 602. For example, the inventory management module 824 may use image data obtained by the cameras 620(1) to determine a location of the user 616. In other implementations, other techniques may be used for determining the user location data 832. For example, data from the smart floor 620(2) may be used to determine the location of the user 616. Based on the user location data 832 and the interaction data 842, a particular interaction may be associated with an account of a particular user 616. For example, if the user location data 832 indicates that the user 616 is present in front of inventory location 614(492) at time 17:47:20 and the interaction data 842 indicates a pick of a quantity of one item 604(27) from the device associated with accessory 102 at inventory location 614(492) at 17:47:27, the user 616 may be billed for that pick.

The data store 820 may store item data 834 that comprises information about a particular type of item 604. The item data 834 may include information indicative of a weight of a single item 604, or a package, kit, or other grouping considered to be a single item 604. The item data 834 may include other characteristics of that type of item 604 such as physical dimensions, characteristics about how the item 604 appears, and so forth. The item data 834 may indicate the types and quantities of items 604 that are expected to be stored at a particular area at a particular inventory location 614. The item data 834 may include other data. For example, the other data may comprise weight distribution of the item 604, and so forth. The item data 834 may also be associated with the physical layout data 836. For example, the item data 834 may indicate that a particular type of item 604 is stowed at a particular device.

The data store 820 may store physical layout data 836 that provides information indicative of where inventory locations 614 are in the facility, location of sensors 620, information about sensor orientation and field of view (where applicable), and so forth. For example, the physical layout data 836 may comprise information representative of a map or floor plan of the facility 602 with relative positions of inventory locations 614, accessories 102 within those inventory locations 614, and so forth. In some implementations the physical layout data 836 may include planogram data indicative of how types of items 604 are to be arranged at the inventory locations 614, location of the areas, and so forth.

The physical layout data 836 may also comprise information about the type of inventory location 614 in use, information indicative of the physical configuration or placement of parallel planar weight sensing devices, accessories 102, weight sensors 620(16), and so forth. For example, the physical layout data 836 may indicate that a particular model parallel planar weight sensing device that is in use at a particular inventory location 614. Using this information, data about the device may be retrieved and used to generate output data 840. The inventory management module 824 may utilize the physical layout data 836 during operation.

The threshold data 838 comprises the various thresholds used by the system. For example, the threshold data 838 may specify values for confidence thresholds that are used to determine if a hypothesis is deemed suitable to be used to generate the interaction data 842.

During operation, electronics associated with the inventory location 614 or the inventory management module 824 may determine output data 840. The output data 840 may be indicative of a detection of a weight change at a particular parallel planar weight sensing device.

As described above, the interaction data 842 may provide information about an interaction, such as a pick of an item 604 from the inventory location 614, a place of an item 604 to the inventory location 614, a touch made to an item 604 at the inventory location 614, a gesture associated with an item 604 at the inventory location 614, and so forth. The interaction data 842 may include one or more of the type of interaction, interaction location identifier indicative of where from the inventory location 614 the interaction took place, item identifier, quantity change to the item 604, user identifier, and so forth.

The inventory management module 824 may generate user billing data 844 based on the cart data 830. For example, when a user 616 leaves the facility 602, the items in the cart data 830 and their respective quantities may be used to generate user billing data 844. In some implementations, the user billing data 844 may be used to bill a payment account associated with the user 616.

The inventory management module 824 may process the sensor data 826 and generate other data. For example, based on the interaction data 842, a quantity of a type of item 604 at a particular inventory location 614 may drop below a threshold restocking level. The inventory management system 622 may generate data comprising a restocking order indicative of the inventory location 614 and a quantity needed to replenish stock to a predetermined level. The restocking order may then be used to direct a robot to restock that inventory location 614.

Other modules 846 may also be present in the memory 816 as well as other data 848 in the data store 820.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
a crossmember comprising:
an upper portion; and
a lower portion;
a first planar beam load cell having a fixed end that is affixed to the upper portion of the crossmember;
a second planar beam load cell having a fixed end that is affixed to the lower portion of the crossmember;
a bracket comprising:
an upper portion, wherein the upper portion of the bracket is proximate to a live end of the first planar beam load cell;
a lower portion, wherein the lower portion of the bracket is proximate to a live end of the second planar beam load cell; and
a first engagement feature;
a first fastener that joins the upper portion of the bracket to the live end of the first planar beam load cell;
a second fastener that joins the lower portion of the bracket to the live end of the second planar beam load cell; and
an accessory comprising:
a second engagement feature that mechanically engages the first engagement feature.

2. The device of claim 1, the accessory further comprising one or more of a hook, a shelf, a bin, or a basket.

3. The device of claim 1, wherein the first planar beam load cell and the second planar beam load cell are each arranged perpendicular to an axis extending through the live end of the first planar beam load cell and the live end of the second planar beam load cell.

4. A device comprising:
a first part comprising:
a first portion; and
a second portion arranged below the first portion;
a second part comprising:
a third portion;
a fourth portion arranged below the third portion; and
a first engagement feature;
a first planar beam load cell having a first end affixed to the first portion and a second end affixed to the third portion; and
a second planar beam load cell having a third end affixed to the second portion and a fourth end affixed to the fourth portion.

5. The device of claim 4, wherein:
the first part further comprises an inner surface and an outer surface and the second part further comprises an inner surface and an outer surface;
the outer surface of the first portion of the first part is proximate to the inner surface of the third portion; and
the outer surface of the second portion of the first part is proximate to the inner surface of the fourth portion.

6. The device of claim 4, wherein:
the first planar beam load cell and the second planar beam load cell are each perpendicular to an axis that extends through the second end and the fourth end.

7. The device of claim 4, wherein:
the first planar beam load cell and the second planar beam load cell are each perpendicular to an axis that extends through the second end and the fourth end;
the first planar beam load cell is aligned in a first direction; and
the second planar beam load cell is aligned in a second direction that is opposite the first direction.

8. The device of claim 4, wherein:
the second end of the first planar beam load cell comprises a first tab that extends from a body of the first planar beam load cell;
the first planar beam load cell is arranged such that weight on the first engagement feature applies tension to the first tab;
the fourth end of the second planar beam load cell comprises a second tab that extends from a body of the second planar beam load cell; and
the second planar beam load cell is arranged such that the weight on the first engagement feature applies tension to the second tab.

9. The device of claim 4, wherein the first part further comprises two or more pieces that are affixed to one another to form the first part.

10. The device of claim 4, further comprising one or more of a hook, a shelf, a bin, or a basket that is attached to the first engagement feature.

11. A device comprising:
a first part comprising:
a first portion; and
a second portion;
a second part comprising:
a third portion;
a fourth portion; and
a first engagement feature;

a first weight sensor that joins the first portion to the third portion; and a second weight sensor that joins the second portion to the fourth portion.

12. The device of claim 11, wherein:

the first part further comprises an inner surface and an outer surface and the second part comprises an inner surface and an outer surface;

the outer surface of the first portion is proximate to the inner surface of the third portion; and the outer surface of the second portion is proximate to the inner surface of the fourth portion.

13. The device of claim 11, wherein:

the first part comprises an inner surface and an outer surface and the second part comprises an inner surface and an outer surface;

the inner surface of the first portion is proximate to the outer surface of the third portion; and the inner surface of the second portion is proximate to the outer surface of the fourth portion.

14. The device of claim 11, wherein:

the first weight sensor comprises a planar beam load cell having a first end and a second end;

the second weight sensor comprises a planar beam load cell having a third end and a fourth end; and the first weight sensor and the second weight sensor are each perpendicular to an axis extending through the first end and the third end.

15. The device of claim 11, wherein:

the first weight sensor comprises a planar beam load cell comprising a first end, a second end, and a first strain concentration feature;

the first end is affixed to the first portion and the second end is affixed to the third portion;

the second weight sensor comprises a planar beam load cell having a third end, a fourth end, and a second strain concentration feature;

the third end is affixed to the second portion and the fourth end is affixed to the fourth portion;

the first weight sensor and the second weight sensor are parallel to one another;

the first strain concentration feature is oriented in a first direction; and the second strain concentration feature is oriented in a second direction that is opposite the first direction.

16. The device of claim 11, wherein the first weight sensor is aligned in a first direction and the second weight sensor is aligned in a second direction that is opposite the first direction.

17. The device of claim 11, wherein the first weight sensor and the second weight sensor comprise one or more of:

a resistive strain gauge, a piezoelectric element, or an optical strain gauge.

18. The device of claim 11, wherein:

the first portion comprises a first piece that is rigid;

the second portion comprises a second piece that is rigid; and the device further comprising:

a third piece that is rigid, wherein the third piece joins the first piece and the second piece.

19. The device of claim 11, further comprising one or more of a hook, a shelf, a bin, or a basket that is attached to the first engagement feature.

20. The device of claim 11, wherein:

the first weight sensor is arranged such that a load on the first engagement feature applies tension to at least a portion of the first weight sensor; and the second weight sensor is arranged such that the load on the first engagement feature applies tension to at least a portion of the second weight sensor.

* * * * *